United States Patent
Brennan et al.

(10) Patent No.: US 10,490,094 B2
(45) Date of Patent: Nov. 26, 2019

(54) TECHNIQUES FOR TRANSFORMING QUESTIONS OF A QUESTION SET TO FACILITATE ANSWER AGGREGATION AND DISPLAY

(71) Applicant: INTERNATIONAL BUSINESS MACHINES CORPORATION, Armonk, NY (US)

(72) Inventors: Paul E. Brennan, Dublin (IE); Scott R. Carrier, Apex, NC (US); Michael L. Stickler, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 14/866,032

(22) Filed: Sep. 25, 2015

(65) Prior Publication Data
US 2017/0092143 A1    Mar. 30, 2017

(51) Int. Cl.
*G06N 5/04* (2006.01)
*G09B 7/00* (2006.01)
*G09B 5/02* (2006.01)
*G09B 7/02* (2006.01)

(52) U.S. Cl.
CPC .......... *G09B 7/00* (2013.01); *G09B 5/02* (2013.01); *G09B 7/02* (2013.01); *G06N 5/04* (2013.01)

(58) Field of Classification Search
None
See application file for complete search history.

(56) References Cited

U.S. PATENT DOCUMENTS 7,461,047 B2   12/2008   Masuichi et al.
8,024,332 B2   9/2011    Cao et al.

OTHER PUBLICATIONS

Chaturvedi, et al., Joint Question Clustering and Relevance Prediction for Open Domain Non-Factoid Question Answering, Proceedings of the 23rd International Conference on World Wide Web, WWW'14, Apr. 2014, pp. 503-514.*
Chaturvedi, et al., Joint Question Clustering and Relevance Prediction for Open Domain Non-Factoid Question Answering, Proceedings of the 23rd International Conference on World Wide Web, WWW'14, Apr. 2014, pp. 503-514 (Year: 2014).*

* cited by examiner

*Primary Examiner* — Wilbert L Starks
(74) *Attorney, Agent, or Firm* — Michael R. Long; Diana Roberts Gerhardt (57) ABSTRACT

A technique for transforming questions for a question answering (QA) system includes clustering received questions by contextual accordance into a question set. A base lexical answer type (LAT) for the question set is determined. LATs of discordant questions in the question set are transformed to the base LAT. Answers for the questions in the question set are aggregated. The aggregated answers are then displayed.

17 Claims, 9 Drawing Sheets

Canonical LAT is unknown
Base LAT is a date

6. <u>How</u> did the British break Enigma?

The canonical LAT in question 6 is replaced with the base LAT to yield new question 6 as follows:

6. <u>When</u> did the British break Enigma?

The new question 6 is then submitted to the QA system and an answer in conformance with the base LAT is received.

FIG. 9

TECHNIQUES FOR TRANSFORMING QUESTIONS OF A QUESTION SET TO FACILITATE ANSWER AGGREGATION AND DISPLAY

BACKGROUND

The present disclosure is generally directed to transforming questions and, more specifically, to techniques for transforming questions of a question set to facilitate answer aggregation and display by a data processing system, such as a cognitive system or a question answering system.

Watson is a question answering (QA) system (i.e., a data processing system) that applies advanced natural language processing, information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

U.S. Patent Application Publication No. 2010/0205180 (hereinafter "the '180 publication") is directed to techniques for identifying and classifying query intent. The '180 publication attempts to identify queries that use different natural language formations to request similar information. Common intent categories are identified for queries requesting similar information. Intent responses are then provided that are associated with identified intent categories. In general, the '180 publication focuses on optimizing a particular query by determining an appropriate intent category and providing appropriate intent responses and, as such, alters a result set.

U.S. Patent Application Publication No. 2013/0187926 (hereinafter "the '926 publication") is directed to automated presentation of information using infographics. The '926 publication discloses displaying data in the form of an infographic relating to an entity. A body of text stores data (i.e., data associated with an entity), determines an appropriate schema, prompts a user to supply missing data for the schema, and generates one or more infographics.

U.S. Patent Application Publication No. 2006/0122979 (hereinafter "the '979 publication") is directed to search processing with automatic categorization of queries. The concepts disclosed in the '979 publication mainly work with simple queries that have a minimal number of words and do not deal with full grammatical queries, as employed in natural language questions.

BRIEF SUMMARY

Disclosed are a method, a data processing system, and a computer program product (embodied in a computer-readable storage device) for transforming questions of a question set to facilitate answer aggregation and display by a data processing system.

A technique for transforming questions for a question answering (QA) system includes clustering received questions by contextual accordance into a question set. A base lexical answer type (LAT) for the question set is determined. LATs of discordant questions in the question set are transformed to the base LAT. Answers for the questions in the question set are aggregated. The aggregated answers are then displayed.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for transforming questions of a question set to facilitate answer aggregation and display by a data processing system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable.

In question answering (QA) systems (e.g., Watson), users can conveniently ask questions in a natural language and receive answers. However, users are sometimes seeking data sets that may not necessarily have been preprocessed and indexed within an available corpora. Additionally, retrieving data sets via a terse, grammatically correct question can be a difficult task. In general, users risk a question being misinterpreted if they provide a QA system with an overly verbose multi-pronged question. Moreover, the best answer for a question may be better presented to the user as an infographic, as contrasted with raw text. In general, a user may have an understanding of the answer they are seeking, but struggle to figure out how to receive such an answer from a QA system. Many users of QA systems may not actually be cognizant of an infographic that would contain data points of interest and visually render the data for easy consumption. For example, answers (i.e., information) sought by an end-user may best be presented in a timeline.

According to the present disclosure, questions are clustered within a question set by contextual theme, and lexical answer types (LATs) are normalized within the question set (i.e., canonical LATs of questions within a question set that are discordant with a determined base LAT are converted to the base LAT). Answers to questions (at least one of which is modified) in a question set are then aggregated, and an answer set (including the answers) is then graphically rendered for ease of consumption by a user. Questions in a question set may be consecutive or non-consecutive questions. Clustering questions into question sets facilitates aggregation of contextually relevant answers to a multitude of questions. Answers can be aggregated across a current QA session, as well as across multiple previous QA sessions. LAT normalization of questions within a question set facilitates answer aggregation of questions that originally have disparate LATs. According to various aspects of the present disclosure, a base LAT is determined for a question set that includes heterogeneous LATs (i.e., a question set in which not all LATs are the same). Canonical LATs of questions of a question set with discordant LATs are converted to a base LAT, and new answers are retrieved in accordance with other answers in the question set.

According to one aspect of the present disclosure, as questions are posed to a QA system, a pairwise assessment is performed to determine the level of correlation between the entities/relations in one question versus another. Questions with highly correlative entities/relations are clustered into a same question set. Intervening questions lacking a correlative relationship with other questions in a question set may be removed from the question set. It should be appreciated that questions in a question set do not need to be sequential. In general, question sets may be skewed towards the most recently posed questions to the QA system, but a question set can span multiple QA sessions (i.e., include questions posed in previous QA sessions). There are a number of conventional techniques for finding so-called question communities or question sets (clusters) of well connected nodes in a graph (e.g., a knowledge graph) that can be employed to cluster entities contained in queries.

As one example, the minimum-cut method (and variants such as ratio cut and normalized cut) may be employed to divide networks into parts. The minimum-cut method has been employed in, for example, load balancing for parallel computing in order to minimize communication between processor nodes. In the minimum-cut method, a network is divided into a predetermined number of parts, usually of approximately the same size, chosen such that the number of edges between groups is minimized. The minimum-cut method works well in many applications for which it was originally intended, but is less than ideal for finding community structures in general networks since it will find communities regardless of whether they are implicit in the structure and will find only a fixed number of them.

Another method for finding community structures in networks is hierarchical clustering in which one defines a similarity measure quantifying some (usually topological) type of similarity between node pairs. Commonly used measures include the cosine similarity, the Jaccard index, and the Hamming distance between rows of an adjacency matrix. Similar nodes are grouped into communities according to the similarity measure. There are several common schemes for performing grouping (e.g., single-linkage clustering in which two groups are considered separate communities if and only if all pairs of nodes in different groups have a similarity lower than a given threshold, and complete linkage clustering in which all nodes within every group have a similarity greater than a threshold).

Another commonly used algorithm for finding communities is the Girvan-Newman algorithm, which identifies edges in a network that lie between communities and then removes them, leaving behind just the communities themselves. The identification of edges is performed by employing a graph-theoretic measure that assigns a number to each edge, which is large if the edge lies between many pairs of nodes. The Girvan-Newman algorithm returns results of reasonable quality and is relatively popular because it has been implemented in a number of standard software packages. However, the Girvan-Newman algorithm may also run slowly, taking time $O(m^2n)$ on a network of 'n' vertices and 'm' edges, making it impractical for networks of more than a few thousand nodes.

Another widely used method for community detection is the so-called modularity maximization method. The modularity maximization method employs a benefit function that measures the quality of a particular division of a network into communities. The modularity maximization method detects communities by searching over possible divisions of a network for one or more divisions that have particularly high modularity. Since exhaustive search over all possible divisions is usually intractable, practical algorithms are usually based on approximate optimization methods such as greedy algorithms, simulated annealing, or spectral optimization, with different approaches offering different balances between speed and accuracy. A popular modularity maximization approach is the Louvain method, which iteratively optimizes local communities until global modularity can no longer be improved given perturbations to the current community state.

Methods based on statistical inference attempt to fit a generative model to network data that encodes a community structure. One advantage of the statistical inference method compared to the alternatives is its more principled nature, and the capacity to inherently address issues of statistical significance. Most statistical inference methods are based on a stochastic block model, as well as variants including mixed membership, degree-correction, and hierarchical structures. Model selection can be performed using principled approaches such as minimum description length and Bayesian model selection. Currently many algorithms exist to perform efficient inference of stochastic block models, including belief propagation and agglomerative Monte Carlo.

As another example, clique based methods may be employed to find communities. As is known, cliques are subgraphs in which every node is connected to every other node in the clique. It should be appreciated that as a node can be a member of more than one clique, a node can be a member of more than one community which yields an overlapping community structure. One approach is to find the maximal cliques, that is to find cliques that are not the subgraph of any other clique. A classic algorithm to find the maximal cliques is the Bron-Kerbosch algorithm. The overlap of cliques can be used to define communities in several ways. The simplest way is to consider only maximal cliques bigger than a minimum size (number of nodes). The union of these cliques then defines a subgraph whose components (disconnected parts) then define communities. An alternative approach is to use cliques of fixed size 'k'. The overlap of these can be used to define a type of k-regular hypergraph or a structure which is a generalization of the line graph (i.e., the case when k=2) known as a clique graph.

The clique graphs have vertices that represent the cliques in the original graph, while the edges of the clique graph record the overlap of the clique in the original graph. Applying a community detection method (which assigns each node to a community) to the clique graph then assigns each clique to a community. As a node may be in several cliques, it can be a member of several communities. For example, the clique percolation method defines communities as percolation clusters of k-cliques. The clique percolation method finds all k-cliques in a network (.e., all the complete sub-graphs of k-nodes). The clique percolation method then defines two k-cliques to be adjacent if they share k−1 nodes (i.e., to define edges in a clique graph). A community is then defined to be the maximal union of k-cliques in which any k-clique can be reached from any other k-clique through series of k-clique adjacencies. That is, communities are just the connected components in the clique graph. Since a node can belong to several different k-clique percolation clusters at the same time, the communities can overlap with each other.

According to the present disclosure, to facilitate question aggregation and graphical display of an answer set, a base LAT is determined for each question set. It should be appreciated that a base LAT for a question set may be determined in a number of ways. For example, a base LAT for a question set may be found by: determining a most frequently occurring LAT for a question set; performing machine learning to find a base LAT (given a collection of different LATs and the nature of the data associated with each LAT and the data's conduciveness for aggregating the answers in the answer set); or user configured LATs or runtime learned LATs based on user feedback (e.g., on previously generated infographic templates (e.g., timeline versus bar charts)).

According to the present disclosure, with a base LAT established for a question set, the focus of discordant questions may be replaced by an answer to an original question for original questions with a concise answer. In any case, discordant LATs are replaced by the base LAT and the modified question is then submitted to the QA system, such that the QA system can retrieve an answer in accordance with the base LAT. According to various embodiments, question set answers are normalized (by LAT) and aggregated for graphical representation. According to one aspect, an information graphic (infographic) is rendered that may optionally include answer confidence scores, supporting evidence, etc.

Figure 1:
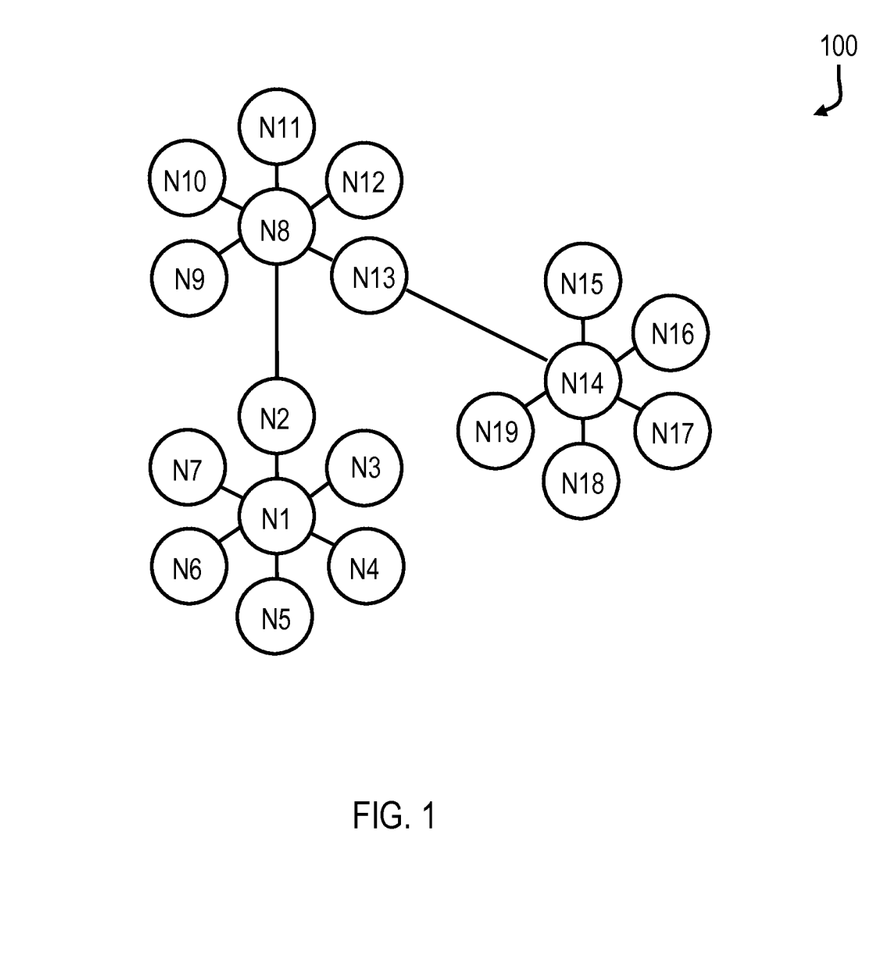
FIG. 1 is a diagram of an exemplary high performance computing (HPC) cluster that includes a number of nodes, with one or more of the nodes including multiple processors that are configured to function as a question answering (QA) system, according to various aspects of the present disclosure.

Conventionally, the Watson system has explored large amounts of structured and unstructured data to find candidate answers for a question (or a problem). According to various aspects of the present disclosure, techniques for performing high performance computing (HPC), or network computing, are described herein that facilitate transforming a question of a question set that has a discordant LAT to a new question having a base LAT of the question set. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
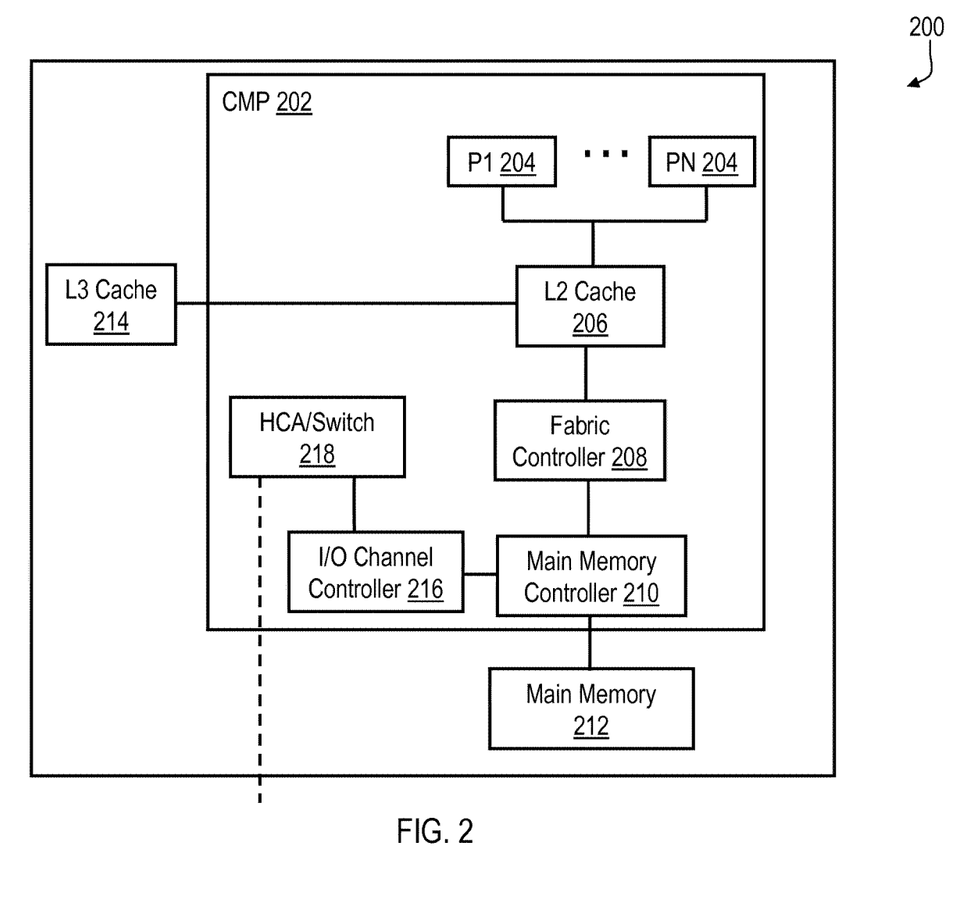
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
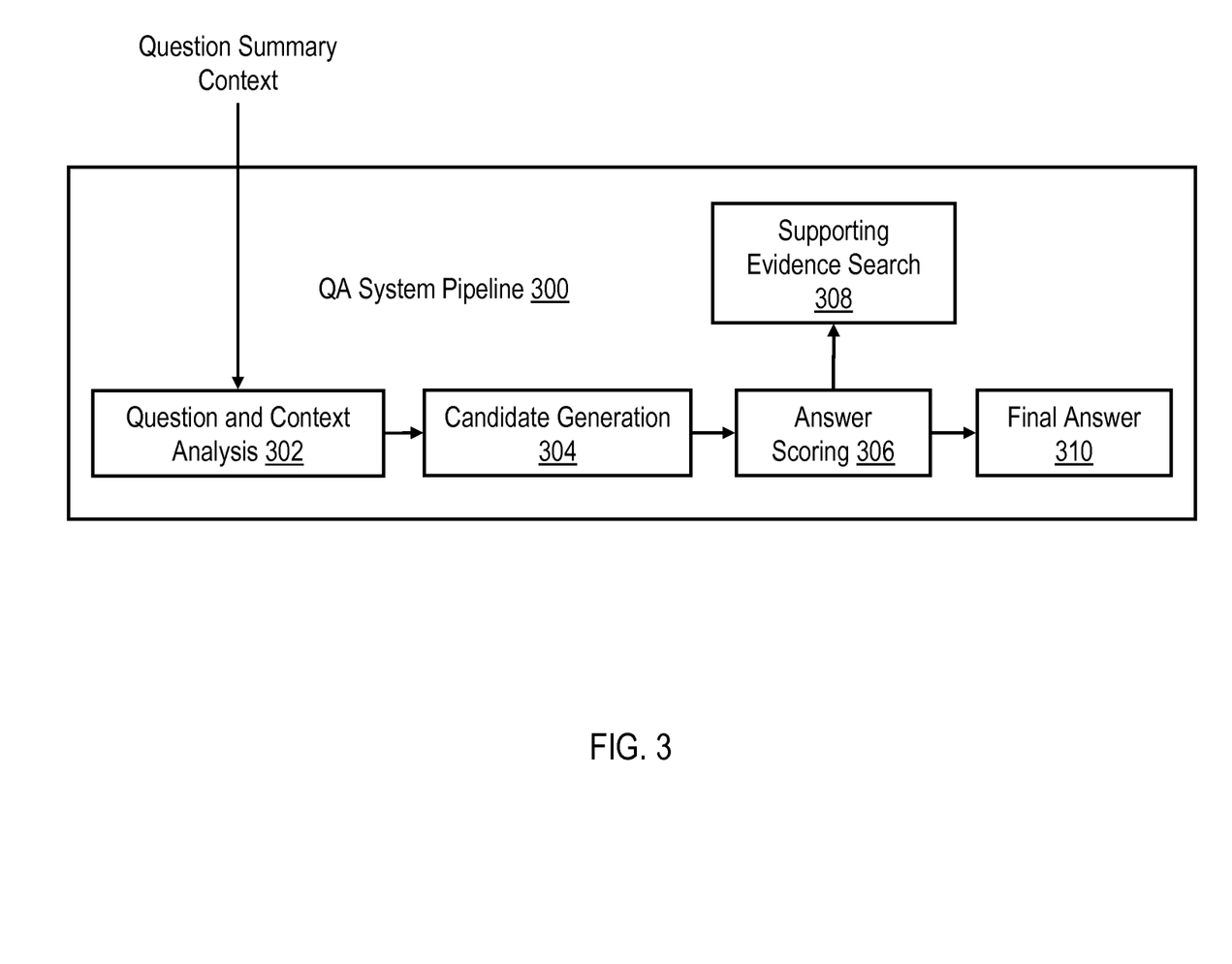
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. A candidate generation block 304 of QA system pipeline 300 receives the output from question and context analysis block 302 at an input and generates candidate answers for the question. The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
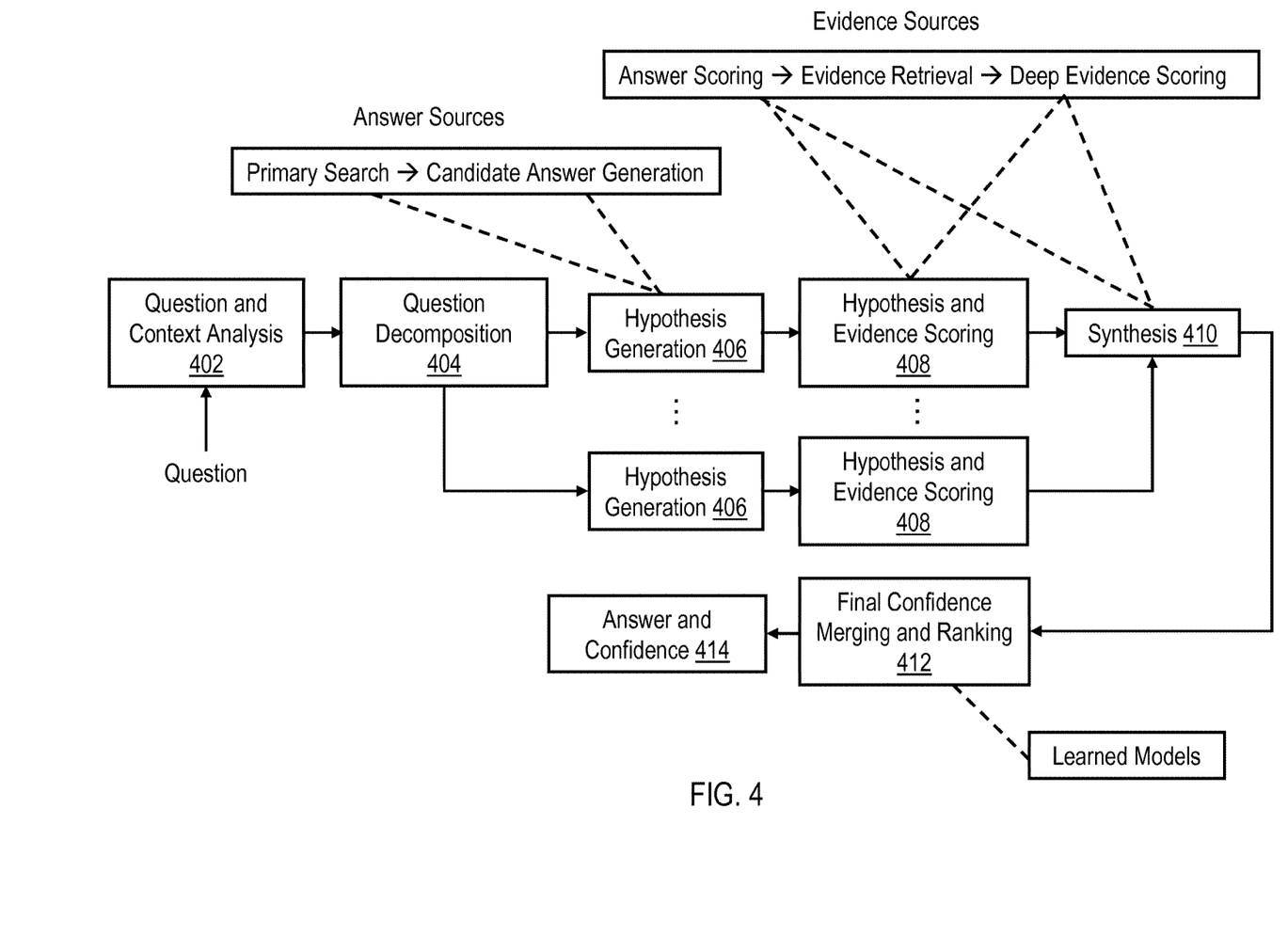
FIG. 4 depicts relevant components of the exemplary QA system pipeline of FIG. 3 in additional detail.

FIG. 4 illustrates relevant components of an exemplary QA system pipeline in additional detail. As is illustrated, question and analysis context block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in block 414, the QA system provides an answer (and may provide a confidence score) to the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

Figure 5:
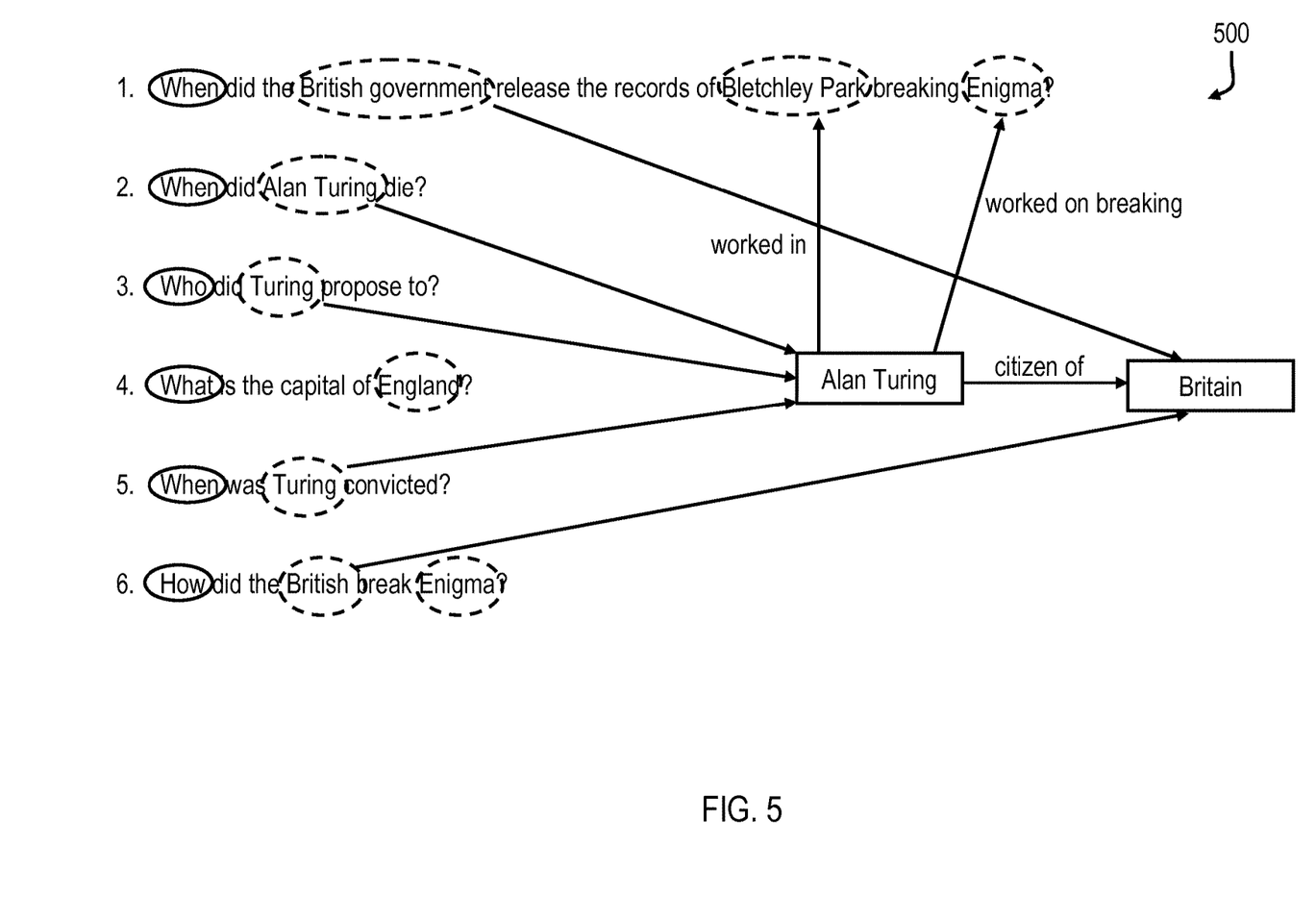
FIG. 5 is a diagram illustrating exemplary questions submitted by a user to a QA system and the relationship of entities in the questions.

With reference to FIG. 5, diagram 500 illustrates an exemplary series of questions in which a user is apparently searching for related events and concepts. The series of questions includes: a first question (i.e., "When did the British government release the records of Bletchley Park breaking Enigma?"); a second question (i.e., "When did Alan Turing die?"); a third question (i.e., "Who did Alan Turing propose to?"); a fourth question (i.e., "What is the capital of England?"); a fifth question (i.e., "When was Turing convicted?"); and a sixth question (i.e., "When did the British break Enigma?").

In various embodiments, a knowledge graph (KG) is employed along with conventional methods/algorithms to determine pairwise relationship strength between entities/relations across questions. As noted above, algorithms directed to node relationship clustering in a complex network can be employed for question clustering. To cluster questions, the pairwise connectivity is measured within the knowledge base between each query. For example, connectivity may be visualized as points connected by lines of varying thickness. It should be appreciated that the fourth question is loosely connected to the other five strongly connected questions, which means that the fourth question will not contribute to any overarching themes and is perhaps a peripheral thought by the user. Assuming the fourth question is dropped, the majority of the remaining questions have a date LAT (i.e., 'when'). In this case, according to the present disclosure, transformation of the non-date LATs to the date LATs is attempted.

Figure 6:
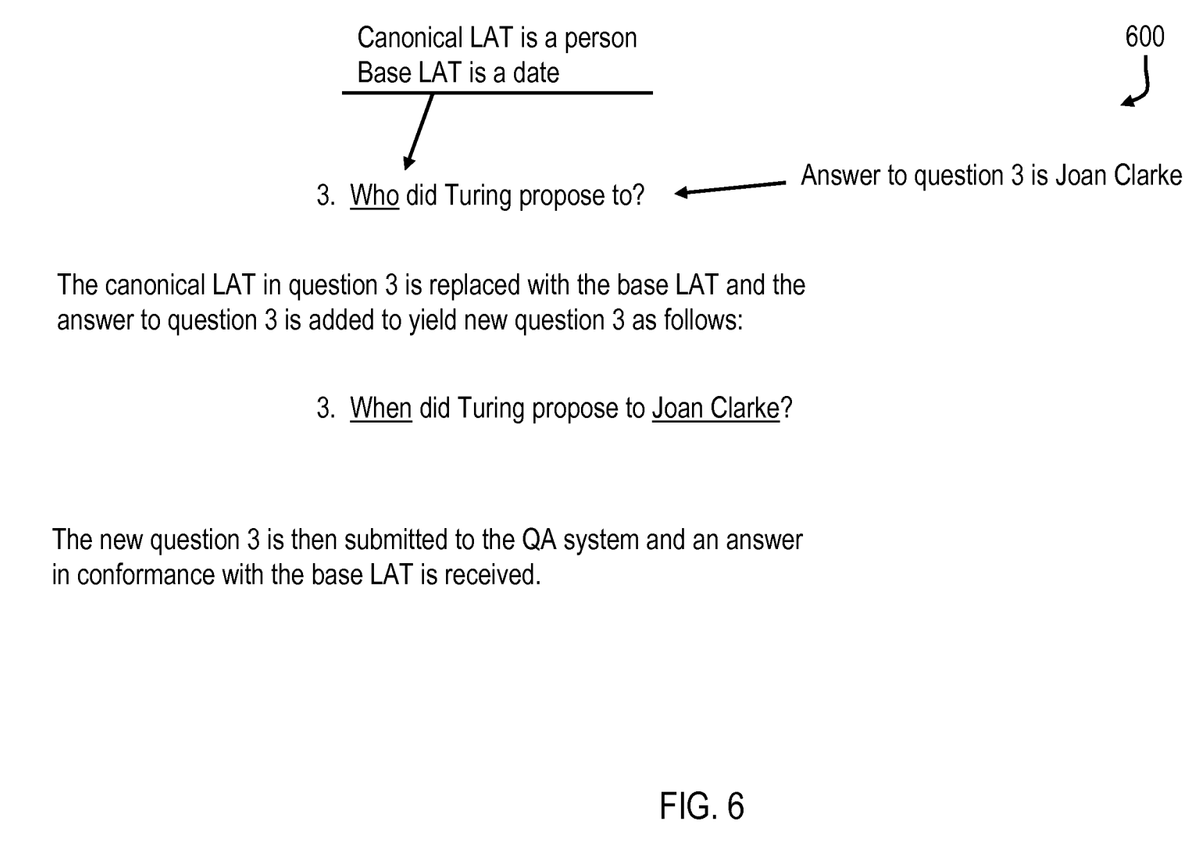
FIG. 6 is a diagram illustrating the transformation of question 3 from FIG. 5, according to one aspect of the present disclosure.

According to one or more embodiments of the present disclosure, discordant questions that have clear LATs and concise answers are rephrased with a base LAT. That is, an answer to a discordant question with a clear LAT and concise answer can be incorporated into a new question. The new question can then be submitted to the QA system for a new answer (in accordance with the base LAT of the question set) that is suitable for rendering in the aggregated infographic. With reference to FIG. 6, a diagram 600 illustrates that original question 3 is an example of a discordant question that has a clear LAT and a concise answer. That is, original question 3 has a canonical LAT that is a person and a concise answer (i.e., Joan Clarke). As such, the canonical LAT in original question 3 is replaced with the base LAT and the concise answer to original question 3 is added to yield a new question 3. The new question 3 (i.e., "When did Turing propose to Joan Clarke?") is then submitted to the QA system and an answer (i.e., 1941) that conforms to the base LAT for the question set is received for aggregation.

Figure 7:
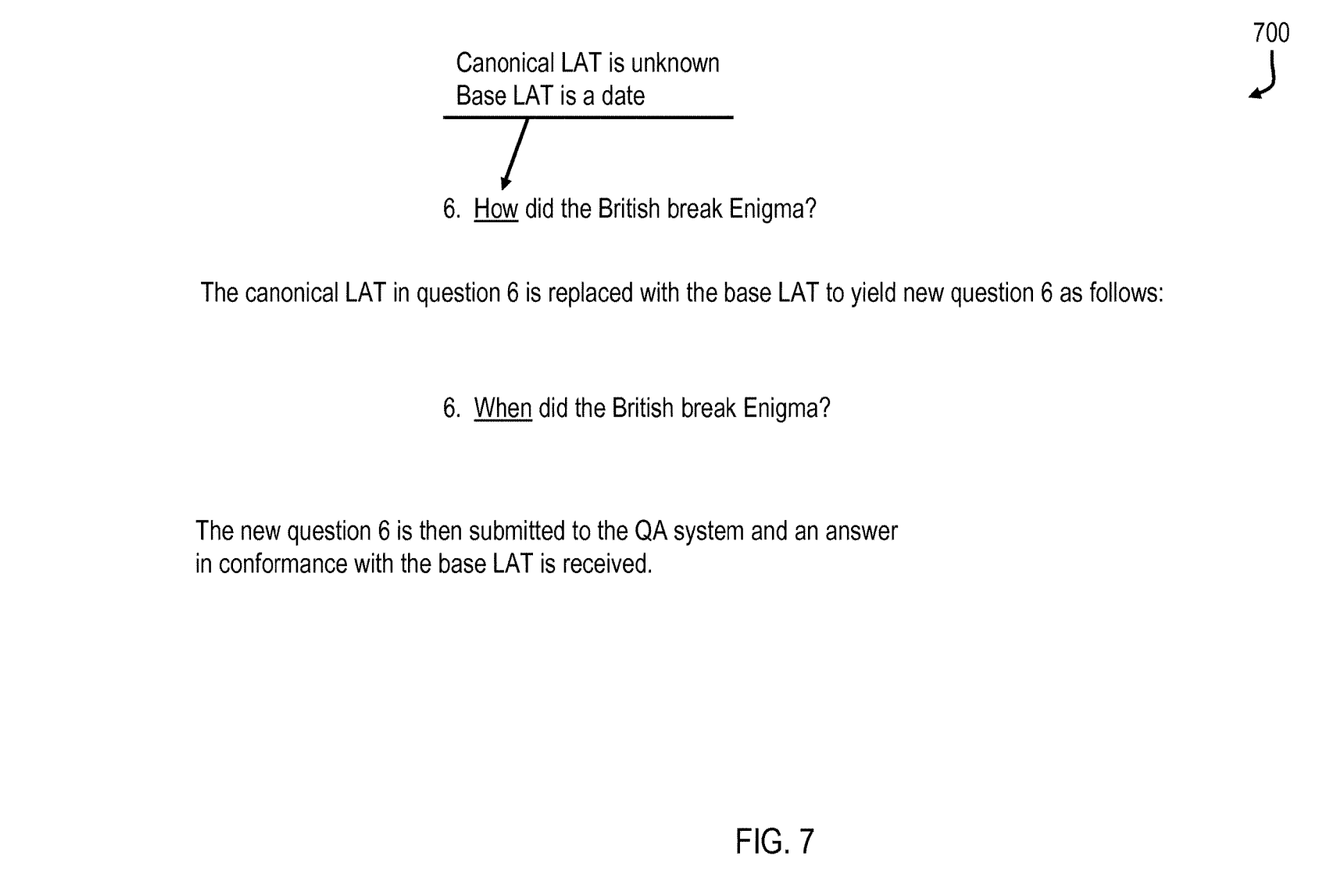
FIG. 7 is a diagram illustrating the transformation of question 6 from FIG. 5, according to another aspect of the present disclosure.

For more open-ended question types with verbose answers that cannot readily be substituted back to a QA system as part of a new question, an attempt is made to rephrase the question with the base LAT of the question set. The rephrased question is then submitted to the QA system and confidence of the answer is evaluated. The aggregated answer set may then be plotted along an axis (e.g., a temporal axis in the case of a date). With reference to FIG. 7, a diagram 700 illustrates that original question 6 is an example of an open-ended question type with a verbose answer that cannot be substituted back, as part of a new question, to a QA system. As such, an attempt is made to rephrase the question with the base LAT of the question set. In this case, the "how" of original question 6 is replaced with a "when" (i.e., the base LAT) to form a new question 6. The new question 6 is then submitted to the QA system and an answer in conformance with the base LAT for the question set is received from the QA system.

Figure 8:
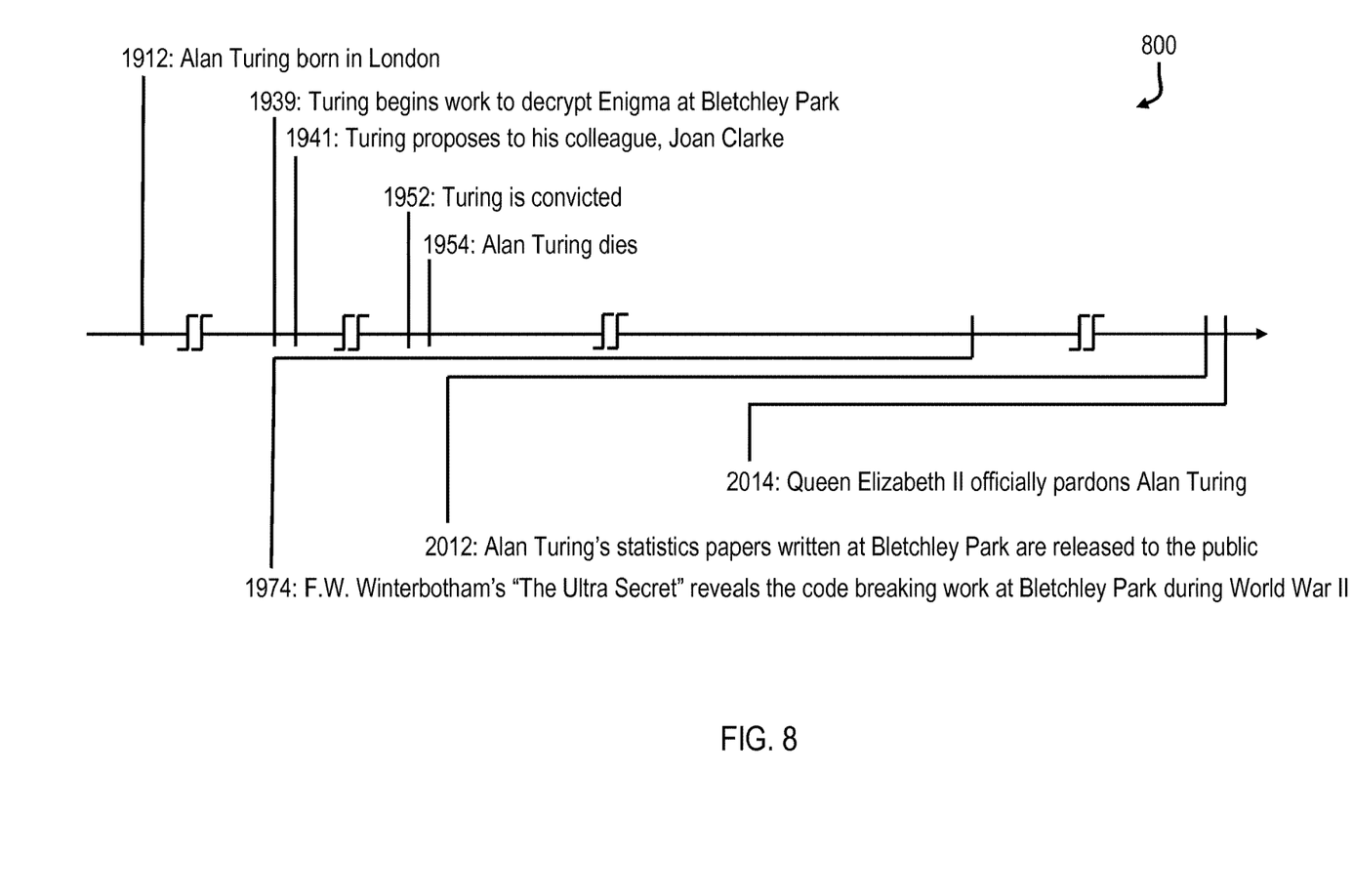
FIG. 8 is an exemplary information graphic (infographic) that displays answers to questions (some of which are set forth in FIG. 5) submitted to a QA system in an easy to read form, according to one aspect of the present disclosure.

FIG. 8 depicts a rendered infographic 800, according to an embodiment of the present disclosure, that includes the answers to questions 1-3, 5, and 6 (with questions 3 and 6 having been modified according to the present disclosure), among other questions not otherwise presented herein.

Figure 9:
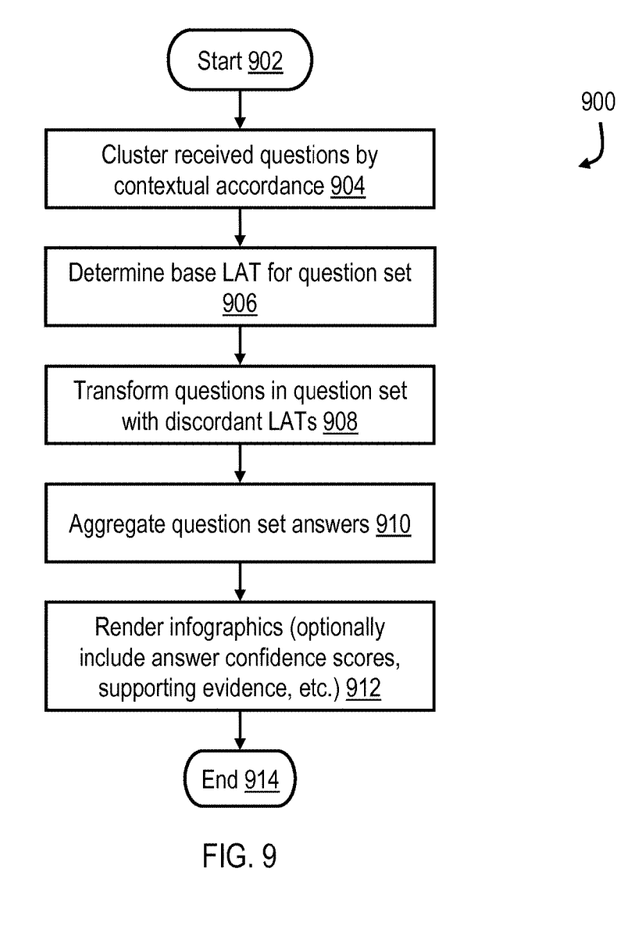
FIG. 9 is a flowchart of an exemplary process for transforming questions of a question set to facilitate answer aggregation and display (e.g., in the form of an infographic, such as that illustrated in FIG. 8), according to an embodiment of the present disclosure.

With reference to FIG. 9, a process 900 for transforming questions for a question answering (QA) system is illustrated. Process 900 may be, for example, executed by one or more data processing systems 200 that implement a QA system in hardware and/or program code. In block 902 process 900 is initiated by data processing system 200, e.g., in response to a user initiating a QA session by inputting a question. In various embodiments, questions are received in a natural language. Next, in block 904, data processing system 200 clusters received questions by contextual accordance into a question set. As noted above, there are a number of conventional techniques for finding so-called question communities or question sets (clusters) of well connected nodes in a graph (e.g., a knowledge graph) that can be employed to cluster entities contained in queries.

Then, in block 906, data processing system 200 determines a base lexical answer type (LAT) for the question set. As noted above, a base LAT may be determined by selecting a most frequently occurring LAT in a question set, through machine learning, or based on user feedback. Next, in block 908, data processing system 200 transforms one or more questions in the question set that have a discordant LAT to the base LAT for the question set. Transforming a question in a question set that has a discordant LAT to a base LAT for the question set may include replacing a focus of a discordant question with an answer to the discordant question and the discordant LAT of the discordant question with the base LAT to create a new question. Alternatively, for open-ended questions, the transforming a question in a question set that has a discordant LAT to a base LAT for the question set may only include replacing the discordant LAT of a discordant question with the base LAT to create a new question.

Then, in block 910, data processing system 200 aggregates answers for the questions in the question set. For example, answers may be aggregated across multiple QA sessions. Answer aggregation may, for example, be facilitated by submitting the new question to the QA system and receiving a new answer to the new question from the QA system. In this case, the new answer is then aggregated in the answers to the questions in the question set. Next, in block 912, data processing system 200 displays the aggregated answers. In one or more embodiments, answers are displayed in an infographic (e.g., see FIG. 8), and questions may be consecutive or non-consecutive questions. The answers may be displayed in an infographic that also includes a confidence score for each of the answers. For example, the infographic may be a timeline, a Venn diagram, a bar chart, or a plot graph. From block 912 control passes to block 914, where process 900 terminates until a user initiates a new QA session.

Accordingly, techniques have been disclosed herein that advantageously transform questions of a question set to facilitate answer aggregation and display by a data processing system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of transforming questions for a question answering (QA) system, comprising:
    clustering, by a data processing system, received questions by contextual accordance into a question set;
    determining, by the data processing system, a base lexical answer type (LAT) for the question set;
    generating, by the data processing system, answers to the questions in the question set;
    transforming, by the data processing system, one of the questions in the question set that has a discordant LAT to a new question having the base LAT;
    generating, by the data processing system, a new answer to the new question;
    aggregating, by the data processing system, the answers for the questions in the question set that originally had the base LAT and the new answer for the new question with the base LAT; and
    displaying, by the data processing system, the aggregated answers, wherein the transforming one of the questions in the question set with the discordant LAT to a new question having the base LAT improves graphical rendering of the aggregated answers in a format for ease of consumption by a user.

2. The method of claim 1, wherein the received questions are in a natural language.

3. The method of claim 1, wherein the answers are displayed in an information graphic (infographic).

4. The method of claim 1, wherein the questions are non-consecutive questions.

5. The method of claim 1, wherein the answers are aggregated across multiple QA sessions.

6. The method of claim 1, wherein the base LAT is determined by one of selecting the most frequently occurring LAT in the question set, machine learning, and user feedback.

7. The method of claim 1, further comprising:
    replacing the focus of a discordant question with an answer to the discordant question and the discordant LAT of the discordant question with the base LAT in the new question.

8. The method of claim 1, further comprising:
    replacing the discordant LAT of a discordant question with the base LAT in the new question.

9. The method of claim 1, wherein the answers are displayed in an information graphic (infographic) that also includes a confidence score for each of the answers.

10. The method of claim 9, wherein the infographic is one of a timeline, a Venn diagram, a bar chart, and a plot graph.

11. A computer program product configured to transform questions for a question answering (QA) system, the computer program product comprising:
    a non-transitory computer-readable storage device; and
    computer-readable program code embodied on the computer-readable storage device, wherein the computer-readable program code, when executed by a data processing system, causes the data processing system to:
    cluster received questions by contextual accordance into a question set;
    determine a base lexical answer type (LAT) for the question set;
    generate answers to the questions in the question set;
    transform one of the questions in the question set that has a discordant LAT to a new question having the base LAT;
    generate a new answer to the new question;
    aggregate the answers for the questions in the question set that originally had the base LAT and the new answer for the new question with the base LAT; and
    display the aggregated answers, wherein the transforming one of the questions in the question set with the discordant LAT to a new question having the base LAT improves graphical rendering of the aggregated answers in a format for ease of consumption by a user.

12. The computer program product of claim 11, wherein the computer-readable program code, when executed by the data processing system, further configures the data processing system to:
    replace the discordant LAT of a discordant question with the base LAT in the new question.

13. The computer program product of claim 12, wherein the computer-readable program code, when executed by the data processing system, further configures the data processing system to:
    replace the focus of the discordant question with an answer to the discordant question in the new question.

14. The computer program product of claim 11, wherein the aggregated answers are displayed in an information graphic (infographic) that also includes a confidence score for each of the answers.

15. The computer program product of claim 14, wherein the infographic is one of a timeline, a Venn diagram, a bar chart, and a plot graph.

16. The computer program product of claim 11, wherein the received questions are in a natural language, the answers are displayed in an information graphic (infographic), the questions are non-consecutive questions, the answers are aggregated across multiple QA sessions, and the base LAT is determined by one of selecting the most frequently occurring LAT in the question set, machine learning, and user feedback.

17. A data processing system, comprising:
a cache memory; and
a processor coupled to the cache memory, wherein the processor is configured to:
  cluster received questions by contextual accordance into a question set;
  determine a base lexical answer type (LAT) for the question set;
  generate answers to the questions in the question set;
  transform a question in the question set that has a discordant LAT to a new question having the base LAT;
  generate a new answer to the new question;
  aggregate the answers for the questions in the question set that originally had the base LAT and the new answer for the new question with the base LAT; and
  display the aggregated answers, wherein the transforming the question in the question set with the discordant LAT to a new question having the base LAT improves graphical rendering of the aggregated answers in a format for ease of consumption by a user.

* * * * *